W. C. KELLOGG.
REVERSIBLE COUPLING FOR GRAVITY CARRIERS.
APPLICATION FILED DEC. 18, 1915.
1,226,222.
Patented May 15, 1917.
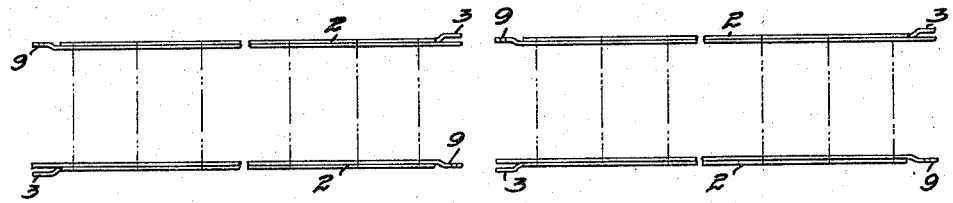
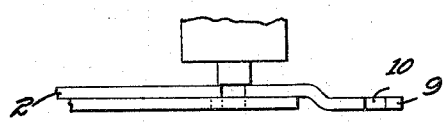
FIG. 1.
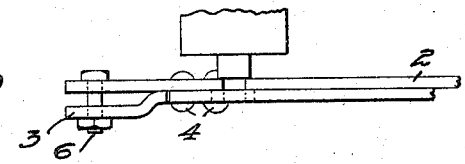
FIG. 4.        FIG. 2.
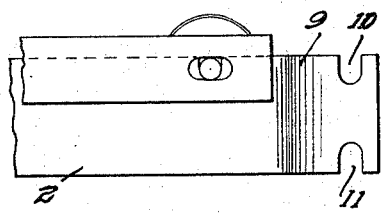        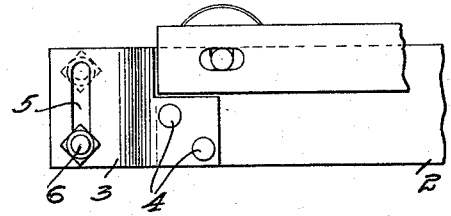
FIG. 5.        FIG. 3.
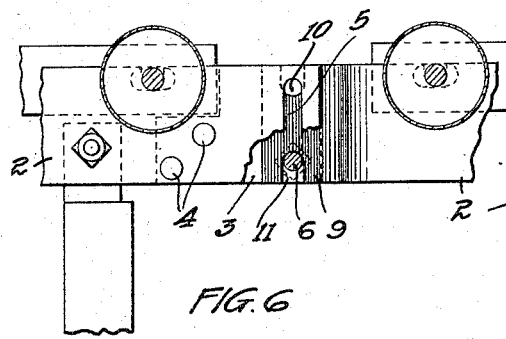        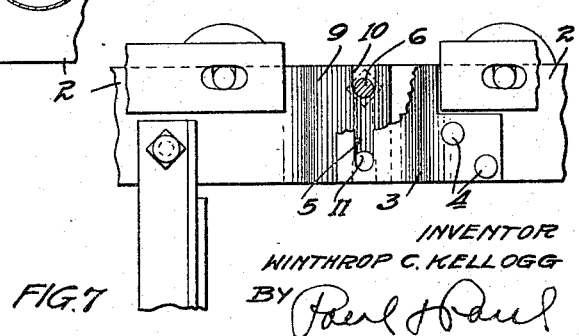
FIG. 6.        FIG. 7.
WITNESSES
INVENTOR
WINTHROP C. KELLOGG
BY
ATTORNEYS

UNITED STATES PATENT OFFICE.

WINTHROP C. KELLOGG, OF WILKINSBURG, PENNSYLVANIA, ASSIGNOR TO MATHEWS GRAVITY CARRIER COMPANY, OF ELLWOOD CITY, PENNSYLVANIA, A CORPORATION OF PENNSYLVANIA.

REVERSIBLE COUPLING FOR GRAVITY-CARRIERS.

1,226,222.  Specification of Letters Patent.  Patented May 15, 1917.

Application filed December 18, 1915. Serial No. 67,585.

*To all whom it may concern:*

Be it known that I, WINTHROP C. KELLOGG, a citizen of the United States, and resident of Wilkinsburg, county of Allegheny, State of Pennsylvania, have invented certain new and useful Improvements in Reversible Couplings for Gravity-Carriers, of which the following is a specification.

This invention relates to improvements in couplings designed for the purpose of connecting together the meeting ends of gravity carriers or other devices employing side rails that are coupled together at their ends.

The invention consists generally in the constructions and combinations hereinafter described and particularly pointed out in the claims.

In the accompanying drawings forming part of this specification,—

Figure 1 represents in plan view two sections of gravity carrier, separated from each other, but having couplings adapted to have their members brought into engagement, Fig. 2 is a plan view, Fig. 3 is a side elevation of one of the female coupling members, Fig. 4 is a plan view, Fig. 5 is a side elevation of one of the male coupling members, Fig. 6 is a side elevation showing two section coupled together with a support under the female coupling member, Fig. 7 is a similar view showing the support under the male coupling member.

In the drawings 2, 2, represent the side rails of a gravity carrier section. These rails are provided with anti-friction rolls extending across from one rail to the other, with their ends journaled in said rails. The rolls are arranged any desired distance apart. I have not shown the rolls in the present drawing, but have indicated their position by dotted line. It is thought that it will be unnecessary to show the details of the roller construction, as the same is not involved in my present invention.

One end of each rail on each side of each carrier is provided with a female member, and the other end of each of such rails is provided with a male member adapted to fit within and couple to the female member and to be supported therein. As here shown each female member is formed by riveting or otherwise securing to the rail near the end thereof a short rail section 3, bent inward and resting against the side of the main rail and held in position by rivets 4. The ends of the rail and the auxiliary rail sections forming the female member are provided with a vertical slot 5. A bolt passes through these slots and extends across the space between the two parts forming the female member, as shown in Figs. 2 and 3 of the drawings. The bolt or stud 6 passes through the slots 5, and hence may occupy a position at the lower end of the slots adjacent to the lower longitudinal edge of the rail, as shown by full lines in Fig. 3, or it may occupy a position at the top of the slots adjacent the upper longitudinal edge of the rail, as shown by dotted lines in the same figure. The bolt or stud 6 is capable of sliding freely from one end of the slots to the other.

The male member consists of the ends 9 of the side rails which are slightly off-set to bring them in coupling position with the female members. These ends are provided with the upper and lower notches or recesses 11, which gives to this end of the rail a substantially T-shape. I may provide the same end of each carrier section with two female members and the opposite end of the section with two male members, but I prefer to provide each carrier section at each end with one female member and one male member, alternating the arrangement at the opposite end and providing there one male member and one female member. With this arrangement the rails are all exactly alike, and may be made up in stock without regard to the side of the carrier at which they are to be used. When the rails are placed in the carrier sections, each section will be arranged with one male and one female member at each end.

I may permit the bolt 6 of the female member to be in the lower end of the slots 5, and may then engage the hook formed by the recess 11 in the under side of the male coupling over this bolt. In this instance the end of the rail having the female coupling member may be supported upon suitable supports and the rail having the male member will be hooked over the bolt in the lower end of the slots 5, and this end of the rail having the male member will be supported by said bolt. This manner of coupling the parts together is illustrated in Fig. 6 of the drawing. I may, however, cause the bolt 6 to rest in the upper end of the slot 5 and in this case the bolt will be supported in the slot 10 in the male member 9. In this case the male member will be supported by a suitable support and the female member will be supported upon the end of said male member.

The construction is exceedingly simple, but is found to be thoroughly practicable and inexpensive. Any two carrier sections may always be coupled together and the end of any carrier section may be supported upon the end of the adjoining section.

The details of the construction may be varied without departing from my invention.

I claim as my invention:

1. A coupling for gravity carriers, comprising a female member composed of bars arranged with a recess between them, a slot extending vertically through both of said bars, a bolt passing through said slots, and a male member having upper and lower recesses forming a T-head, either one of said recesses being arranged to engage the bolt extending through the slots in the female member, substantially as described.

2. A coupling for gravity carriers, comprising a female member having a vertical recess, a slot extending vertically through both walls of said recess, a bolt passing through said slots, and a male member arranged to project into said recess and having a T-head, either side of the head being arranged to engage the bolt extending through the slots in the female member, substantially as described.

In witness whereof, I have hereunto set my hand this 7th day of December, 1915.

WINTHROP C. KELLOGG.

Witnesses:
BERTRAM D. COBNER,
ANDREW O. AHL.

Copies of this patent may be obtained for five cents each, by addressing the "Commissioner of Patents, Washington, D. C."